(12) United States Patent
Caugherty

(10) Patent No.: US 6,597,702 B1
(45) Date of Patent: Jul. 22, 2003

(54) FAST CONNECT OPTION FOR ENFORCING SYMMETRIC CODEC CAPABILITIES

(75) Inventor: Jill Caugherty, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/306,221

(22) Filed: May 6, 1999

(51) Int. Cl.$^7$ .............................................. H04L 12/26
(52) U.S. Cl. ...................... 370/410; 370/465; 704/270
(58) Field of Search ................................ 370/351–356, 370/465, 468, 410, 384–385; 704/201, 211, 221, 270

(56) References Cited

U.S. PATENT DOCUMENTS

| | | | |
|---|---|---|---|
| 5,504,773 A | * | 4/1996 | Padovani et al. ............ 370/441 |
| 6,052,819 A | * | 4/2000 | Barker et al. ................ 370/469 |
| 6,256,612 B1 | * | 7/2001 | Vo et al. ..................... 704/201 |
| 6,278,708 B1 | * | 8/2001 | Von Hammerstein et al. ... 370/389 |
| 6,400,966 B1 | * | 6/2002 | Andersson et al. ......... 370/337 |

OTHER PUBLICATIONS

H.245 ITU–T Recommendation H.245–Version 6; Line Transmission of Non–Telephone Signals–Control Protocol for Multimedia Communication (Jun. 3, 1999) (131 pages).

H.323 ITU–T Recommendation H.323; Audiovisual and Multimedia Systems–Packet–Based Multimedia Communications Systems (Sep., 1999) (317 pages).

* cited by examiner

Primary Examiner—Melvin Marcelo
Assistant Examiner—Inder Pal Mehra
(74) Attorney, Agent, or Firm—Marger Johnson & McCollom

(57) ABSTRACT

The object of the invention is a communications system that increases successful call setups, improves resource utilization, and reduces overhead. The communications system of the present invention includes a calling endpoint coupled to a called endpoint through a packet switched network. A flag is encoded in a fast call setup message sent from the calling endpoint to the called endpoint. The flag allows the calling endpoint to present the called endpoint with a plurality of different codec options for the send and receive directions. The called endpoint can then choose which one of the codec options is best suited for the proposed call. If the calling endpoint does not support asymmetric channel capabilities, the flag indicates to the called endpoint that the calling endpoint wishes it choose the same or symmetric capability from the plurality of codec options presented for both the send and receive directions. Conversely, if the calling endpoint supports asymmetric channel capabilities, the flag indicates to the called endpoint that it is unrestricted in its choice of which codecs to select for encoding and decoding data. By establishing the call in this manner, a calling endpoint that does not support asymmetric codec capabilities is not faced with call rejection from a called endpoint that has selected different or asymmetric codecs for the send and receive directions. Thus, more calls are successfully set up avoiding the necessity of defaulting to less efficient call procedures.

30 Claims, 4 Drawing Sheets

FAST CONNECT OPTION FOR ENFORCING SYMMETRIC CODEC CAPABILITIES

BACKGROUND OF THE INVENTION

1. Field of the Invention

This invention relates to a packet-based multimedia communications system and, more particularly, to a system having a fast connect option for enforcing symmetric codec capabilities in call setup procedures such as the fast connect setup in the International Telecommunication Union Standardization Sector (ITU-T) Recommendation H.323, incorporated herein by reference.

2. Description of the Prior Art

The International Telecommunications Union (ITU) H.323 standard describes terminal and other entities that provide multimedia communication services over Packet Switched Networks (PSN). H.323 devices provide real-time audio, video, and/or data communications. H.323 devices must support audio, while data and video are optional. If data or video is supported, the device must use a specified common mode of operation, so that all terminals supporting that media type can interface properly.

FIG. 1 is a functional block diagram of a packet-based multimedia communications system 10. The system 10 includes a PSN 12 connected to terminals 14, 16, and 18, gatekeeper 20, gateway 22, and multi-point control unit 24. Gateway 22 provides Voice Over Internet Protocol (VoIP) access between the PSN 12 and a Public Switched Telephone Network (PSTN) 26 and an Integrated Services Digital Network (ISDN) 28. PSTN 26 is connected to several PSTN endpoints, such as PSTN endpoints 30 and 32. PSTN endpoints 30 and 32 are standard circuit switched telephones. Phones 30 and 32 access one another through PSTN 26. Phones 30 and 32 access ISDN endpoints 34 and 36 through gateway 22. Similarly, ISDN 28 is connected to ISDN endpoints, such as ISDN endpoints 34 and 36. ISDN endpoints 34 and 36 are, for example, digital visual telephone terminals and equipment. ISDN endpoints 34 and 36 access one another through the ISDN 28 and access phones 30 and 32 through gateway 22.

VoIP services are accessed from the phones 30 and 32 via PSTN 26, more directly through the PSN 12 by digital phones 34 and 36 via ISDN 28, or from an H.323 endpoint to another through the PSN 12. In the first two cases, a phone connection involves dialing into an incoming gateway and connecting to a terminating gateway that eventually connects to a destination telephone.

The H.323 standard covers the technical requirements for multimedia communications systems where the underlying transport is a PSN 12. The PSN 12 may include Local Area Networks (LAN), Enterprise Area Networks, Metropolitan Area Networks, Intra-Networks, and Inter-Networks (including the Internet). The PSN 12 also includes dial up connections or point-to-point connections over the PSTN 26 or the ISDN 28 that use an underlying packet based transport such as a point-to-point protocol. These networks may consist of a single network segment, or they may have complex topologies that incorporate many network segments interconnected by other communications links.

The terminals 14, 16, and 18 provide audio and optionally video and data communications capability in point-to-point or multi-point conferences. Interworking with other terminals, such as PSTN endpoints 30 and 32 or ISDN endpoints 34 and 36, is accomplished through gateways like gateway 22 if a PSTN 26 or an ISDN 28, respectively, is involved. Gatekeeper 20 provides admission control and address translation services. Multi-point control unit 24 provides support for multi-point conferences. The scope of H.323 is defined by the dotted lines 38 and does not include the network interface, the physical network, or the transport protocol used on the network. Examples of these networks that could comprise part of PSN 12 include but are not limited to the Ethernet (Institute of Electrical and Electronic Engineers (IEEE) 802.3), Fast Ethernet (IEEE 802.3$\mu$), Fiber Distributed Data Interface (FDDI), Token Ring (IEEE 802.5), and Asynchronous Transfer Mode (ATM).

H.323 endpoints, such as terminals 14, 16, or 18, multi-point control unit 24, or gateway 22, may establish media channels in a call using either the procedures defined in ITU-T Recommendation H.245 (H.245) or the Fast Connect procedure described in the H.323 standard although the latter is preferred. The Fast Connect procedure allows the endpoints to establish a basic point-to-point call with as few as one round-trip message exchange, enabling immediate media stream delivery upon call connection. The H.245 requires a set of message exchanges to setup the call. For example, the H.245 requires determining a master-slave exchanging a capability, opening logical channels on both endpoints and acknowledging the logical channels on both endpoints, closing and re-opening the logical channels, and the like. The Fast Connect feature eliminates the need to establish a separate H.245 Transfer Control Protocol (TCP) connection by using the existing H.225 channel for a simplified capability exchange between two endpoints. Another advantage of a Fast Connect call is that the audio, data, and/or video paths, if supported, are available much sooner than would be the case using the H.245 procedures. In essence, Fast Connect uses the resources more efficiently, reduces the overhead of establishing media channel(s) for a call, and establishes the media paths sooner than using the H.245 procedures.

FIG. 2 is a functional block diagram describing a drawback with the communications system 10 shown in FIG. 1. A calling endpoint 40, such as gateway 22 (FIG. 1), initiates a call by sending a message containing certain predetermined elements to a called endpoint 42, such as terminal 18. In H.323, the Fast Connect call procedure is initiated by sending a SETUP message containing a faststart element. The faststart element consists of a sequence of OpenLogicalChannel structures 43 describing a particular media channel proposal—audio, video, or data—and a certain direction—send or receive—. Where the media channel proposal involves audio, the OpenLogicalChannel structure 43 describes, among other things, media channel capabilities associated with respective audio coder/decoders—commonly known as codecs—that the calling endpoint 40 can use to encode and decode audio signals. In other words, the calling endpoint 40 advertises its send and receive codec capabilities to the called endpoint 42. Here, the send direction—the term "forward" is used in the H.323 standard—refers to signals traveling from the calling endpoint 40 to the called endpoint 42. Conversely, the receive direction—"reverse" in the H.323 standard—refers to signals traveling from the called endpoint 42 to the calling endpoint 40.

For example, the calling endpoint 40 sends notification 43 to the called endpoint 42 that it has audio codec 1, codec 2, . . . , codec N (44) available for encoding signals to packets (send direction) and audio codec 1, codec 2, . . . , codec M (46) available for decoding the packets back into audio or video signals (receive direction). In the H.323, the plurality of codec options is included in the OpenLogicalChannel structure 43 sent in the call setup message. The codec options are, for example, audio G.729, G.711, G.723, G.726, and the like.

The called endpoint 42 chooses one of the codec capabilities 44 proposed by the calling endpoint 40 for the send direction and one codec 46 for the receive direction. For example, endpoint 42 selects codec 2 for encoding packets in the send direction 48 and selects codec 1 for decoding packets in the receive direction 50. The choice of which codec the called endpoint 42 will choose depends on several factors including which codecs the called endpoint 42 supports and is configured to use. More specifically, the choice of codecs depends on the codecs supported by digital signal processing software or firmware included in the called endpoint 42.

Often, the calling endpoint 40 does not support using different codecs for the send and receive directions (asymmetric). In such a case, if the called endpoint 42 selects one codec for the send direction and a different codec for the receive direction, the calling endpoint 40 will be unable to proceed with the fast call. If the calling endpoint 40 wishes to maintain a speech path, for example, with the called endpoint 42, the calling endpoint 40 must revert from the Fast Connect call to a normal call by establishing a separate, slower, H.245 TCP connection. The called endpoint 42 may also refuse the Fast Connect call by not returning the faststart element in any return message up to and including the CONNECT message. When the Fast Connect call cannot be initiated, the H.245 procedure is used for capabilities exchange and opening of media channels. It is possible for the called endpoint 42 to select the same codecs for the send and receive direction thereby successfully establishing a fast call—e.g., a H.323 Fast Connect call—with the calling endpoint 40. However, it is not guaranteed under current protocol specifications.

It is important to emphasize that the H.245 TCP call procedures require much more overhead to establish calls than the H.323 procedures. An H.245 call also uses resources less efficiently and is slower. Thus, is it beneficial to establish calls using the Fast Connect procedures whenever possible.

A workaround for the above-described drawback is shown in FIG. 3. Assume again that the calling endpoint 40 does not support different or asymmetric codecs for the send and receive directions. The calling endpoint 40 provides the called endpoint 42 a single choice of codec 52 for the send and receive direction, for example, codec 2. Because the called endpoint 42 is only given the one choice of codec 2 for both send and receive directions, endpoint 42 is precluded from choosing asymmetric codecs. However, if the called endpoint 42 does not support the one codec—codec 2—proposed by the calling endpoint 40, the call is rejected, requiring invocation of the H.245 call setup procedures.

Accordingly, a need remains for a communications system affording a calling endpoint the ability to offer a called endpoint more than a single choice of codecs for encoding and decoding data in the send and receive directions while at the same time alerting the called endpoint when only symmetric codecs must be selected for encoding and decoding data.

SUMMARY OF THE INVENTION

The object of the invention is a communications system that increases successful fast call setups, improves resource utilization, and reduces overhead. The communications system of the present invention includes a calling endpoint coupled to a called endpoint through a packet switched network. A flag is encoded in a fast call setup message sent from the calling endpoint to the called endpoint through the packet switched network. The flag indicates to the called endpoint whether the calling endpoint wishes for the called endpoint to select asymmetric channel capabilities for encoding and decoding audio and video signals in the send and receive directions. The flag allows the calling endpoint to present the called endpoint with a plurality of different codec options for the send and receive directions. The called endpoint can then choose which one of the codec options is best suited for the proposed call based on the wishes of the calling endpoint.

If the calling endpoint does not support asymmetric channel capabilities, the flag indicates to the called endpoint that the calling endpoint wishes it choose the same or symmetric capability from the plurality of codec options presented for both the send and receive directions. If the calling endpoint supports asymmetric channel capabilities, the flag indicates to the called endpoint that the calling endpoint believes it is unrestricted in its choice of which codecs to select for encoding and decoding data. That is, the called endpoint can choose one codec for encoding data in the send direction and select the same or a different codec for decoding encoded data in the receive direction.

By establishing the call in this manner, a calling endpoint that does not support asymmetric codec capabilities is not faced with a failed call because the called endpoint has selected different or asymmetric codecs for the send and receive directions. Thus, more calls are successfully set up avoiding the necessity of defaulting to less efficient call procedures.

A method for improving communications efficiency in a packet based communications system includes sending a call setup message from a calling endpoint to a called endpoint. The calling endpoint sends a call setup message that offers a choice of different codecs for encoding audio, video, and/or data signals into packets in the send direction and another choice of codecs for decoding previously encoded packets in the receive direction. The called endpoint evaluates the flag to determine whether the calling endpoint supports asymmetric capabilities. The called endpoint then chooses a channel capability for the send and receive directions based on the flag. If the calling endpoint has set the flag to indicate symmetric capabilities, the called endpoint must chose the same codec for the send and receive directions. Conversely, if the calling endpoint has not set the flag to enforce the selection of symmetric capabilities, the called endpoint is unrestricted in its choice of codecs. That is, the called endpoint can choose the same codec or different codec for each of the send and receive channels.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

Figure 1:
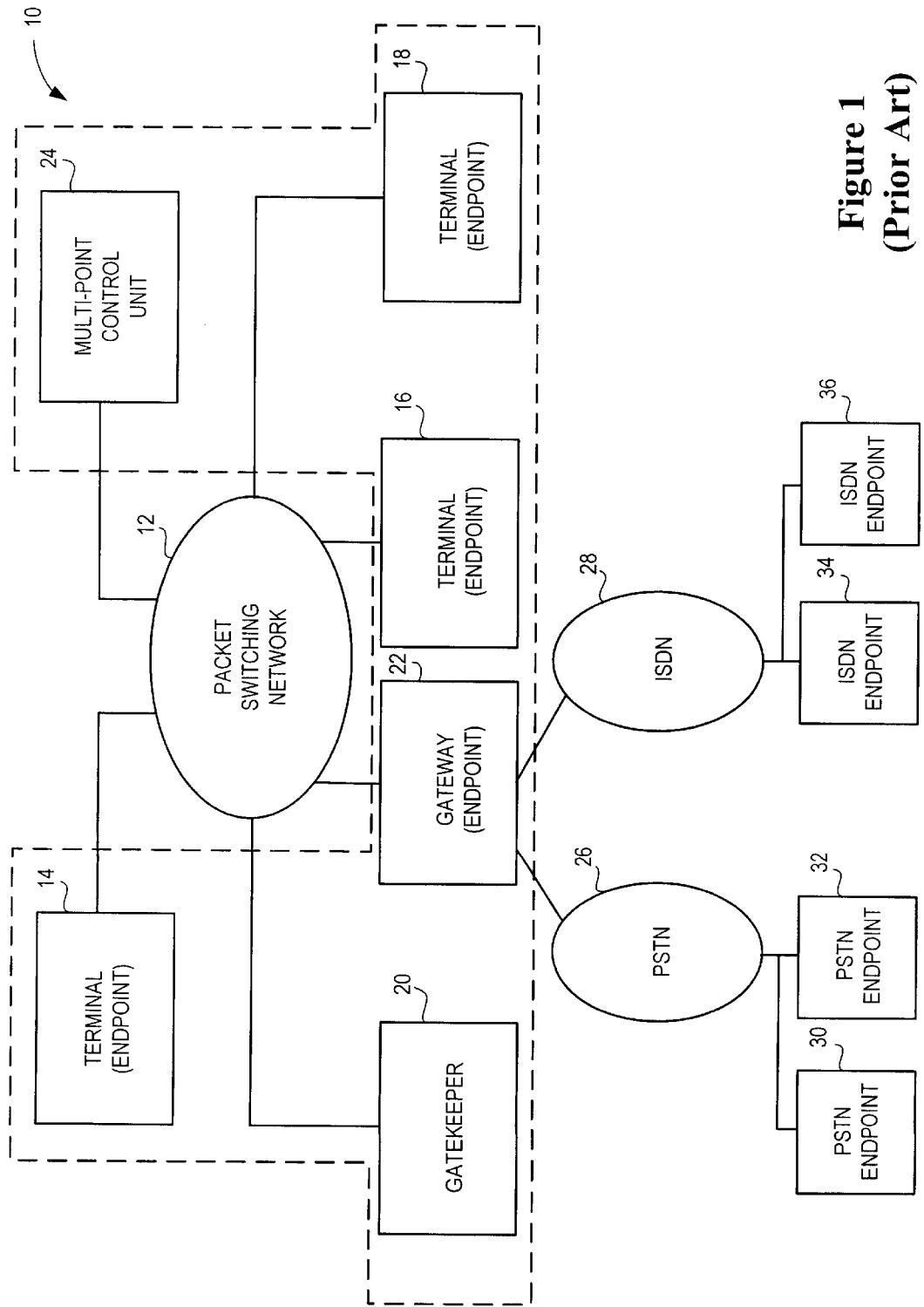
FIG. 1 is a functional block diagram of a communications system.
Figure 2:
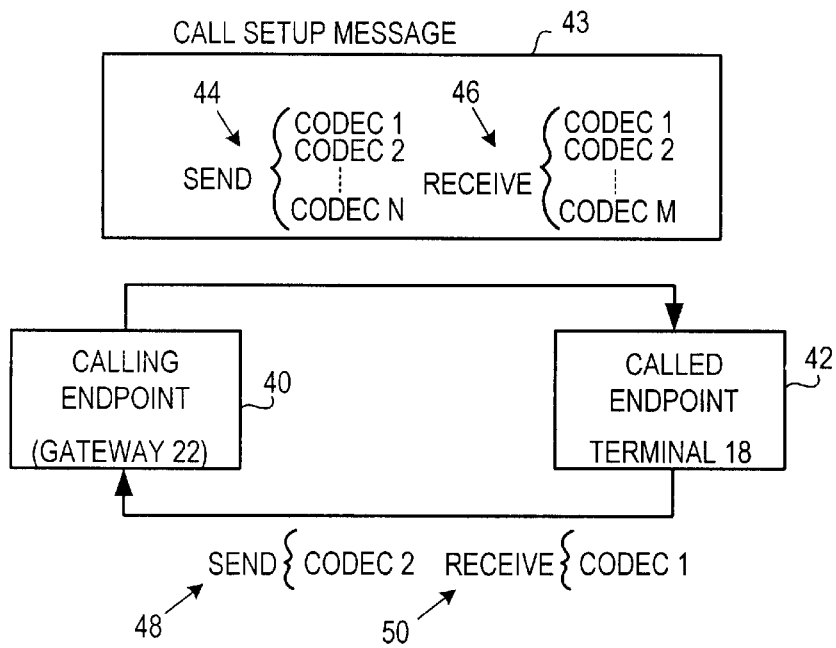
FIG. 2 is a functional block diagram of a drawback with call setups using ITU-T H.323.
Figure 3:
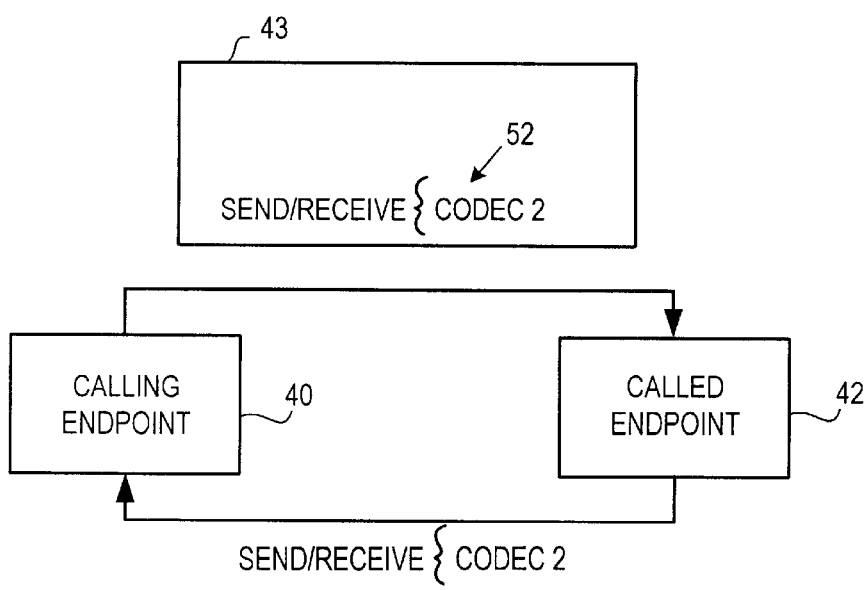
FIG. 3 is a functional block diagram of a work around for the drawback described in FIG. 2.

The present invention eliminates the drawbacks associated with the communications system described above with reference to FIGS. 2 and 3. The invention is incorporated into the communications system 10 described with reference to FIG. 1. For simplicity, the invention is described below only in terms of audio codec selection. However, the invention is useful in communication systems for the selection of capabilities other than audio codec selection. For example, the present invention can be used to select video and data capabilities such as DTMF symmetric relay capabilities and T.120 data and video formats.

Figure 4:
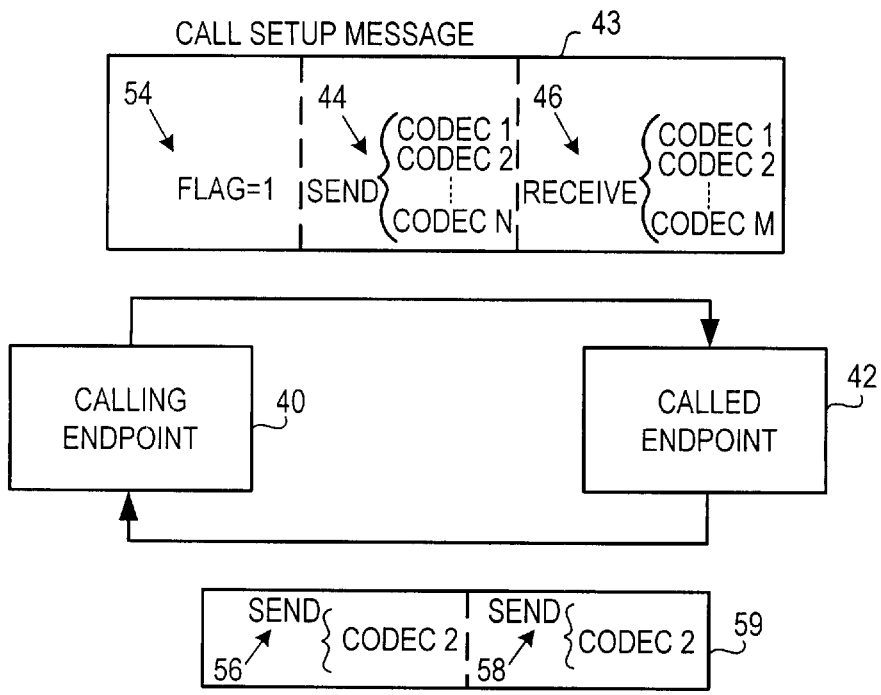
FIG. 4 is a functional block diagram of one aspect of the present invention.

Referring to FIG. 4, the calling endpoint 40 initiates a call by sending a call setup message 43 to the called endpoint 42. As explained with reference to FIG. 2, in H.323, the Fast Connect call procedure is initiated by sending a SETUP message containing the faststart element. The faststart element consists of a sequence of OpenLogicalChannel structures describing, among other things, media channel capabilities associated with respective audio codecs that the calling endpoint 40 proposes for encoding and decoding audio signals in the send and receive directions, respectively. The calling endpoint 40 notifies the called endpoint 42 that it has available a first plurality of channel capabilities or codecs 44 for the send direction, i.e., audio codec 1, codec 2, ..., codec N and a second plurality of channel capabilities 46 for the receive direction, i.e., audio codec 1, codec 2, ..., codec M.

The calling endpoint 40 also sends a flag 54 to the called endpoint 42. The flag 54 indicates whether the calling endpoint 40 wishes for the called endpoint 42 to select asymmetric or different channel capabilities (codecs) for the send and receive directions. The flag 54 is included in the call setup message 43 and can be, for example, a bit having a first and a second state. Thus, the call setup message 43 not only identifies codec options for 44 and 46, but also includes the flag 54. If the calling endpoint 40 does not support asymmetric channel capabilities, the flag 54 indicates to the called endpoint 42 that the calling endpoint 40 wishes it choose the same or symmetric capability from the plurality of codec options presented for both the send and receive directions. Conversely, if the calling endpoint 40 supports asymmetric channel capabilities, the flag 54 indicates to the called endpoint 42 that the calling endpoint 40 believes it is unrestricted in its choice of which codecs to select for encoding and decoding data. That is, the called endpoint 42 can choose one codec for encoding data in the send direction and select the same or a different codec for decoding encoded data in the receive direction.

The functional block diagram of FIG. 4 is instructional on how the present invention operates. The calling endpoint 40 initiates the call by sending a setup message 43 to the called endpoint 42. The setup message 43 contains a first plurality of codecs 44 available for encoding audio and video signals into packets in the send direction—codec 1, codec 2, ..., codec N—and a second plurality of codecs 46 for decoding the receive packet, back into audio or video signals in the receive direction—codec 1, codec 2, ..., codec M. The setup message 43 also includes a single-bit flag 54 having a first and a second state for indicating to the called endpoint 42 whether the calling endpoint 40 supports asymmetric codecs. The called endpoint 42 receives the call setup message 43, parses the message for the flag 54, and evaluates the flag 54. The called endpoint 42 then chooses a codec according to the state of the flag 54. If the flag 54 is in a first state, the calling endpoint 40 does not support asymmetric codecs. Conversely, if the flag 54 is in a second state, the calling endpoint 40 does support asymmetric codecs. If the flag 54 is in a first state, the called endpoint 42 chooses the same codec from the first and second plurality of codecs 44 and 46 for both encoding and decoding data in the send and receive directions, respectively. Otherwise, the called endpoint 42 is unrestricted in its choice of codecs being able to choose the same or a different codec from the first and second plurality of codecs.

Figure 5:
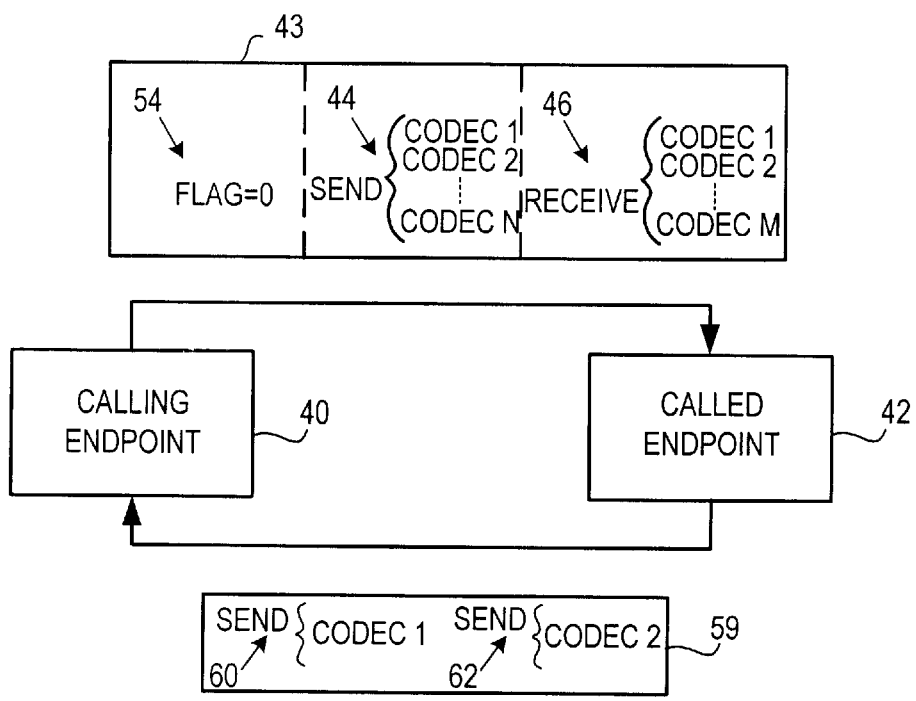
FIG. 5 is a functional block diagram of another aspect of the present invention.

For example, if the flag 54 is in a first logic high state as shown in FIG. 4, the called endpoint 42 chooses a single codec, e.g., codec 2, for both the send and receive directions 56 and 58, respectively. The selection is sent in a packet 59 back to calling endpoint 40. However, if the flag 54 is in a second logic low state, as shown in FIG. 5, the called endpoint 42 is unrestricted in its choice of codecs. Thus, called endpoint 42 can choose different codecs for the send and receive directions. For example, codec 1 is selected in packet field 60 for encoding data and codec 2 is selected in packet field 62 for decoding data as shown in FIG. 5.

Unauthorized use of the flag 54 can be easily detected by applying an appropriate bitmask to the setup message 43.

Figure 6:
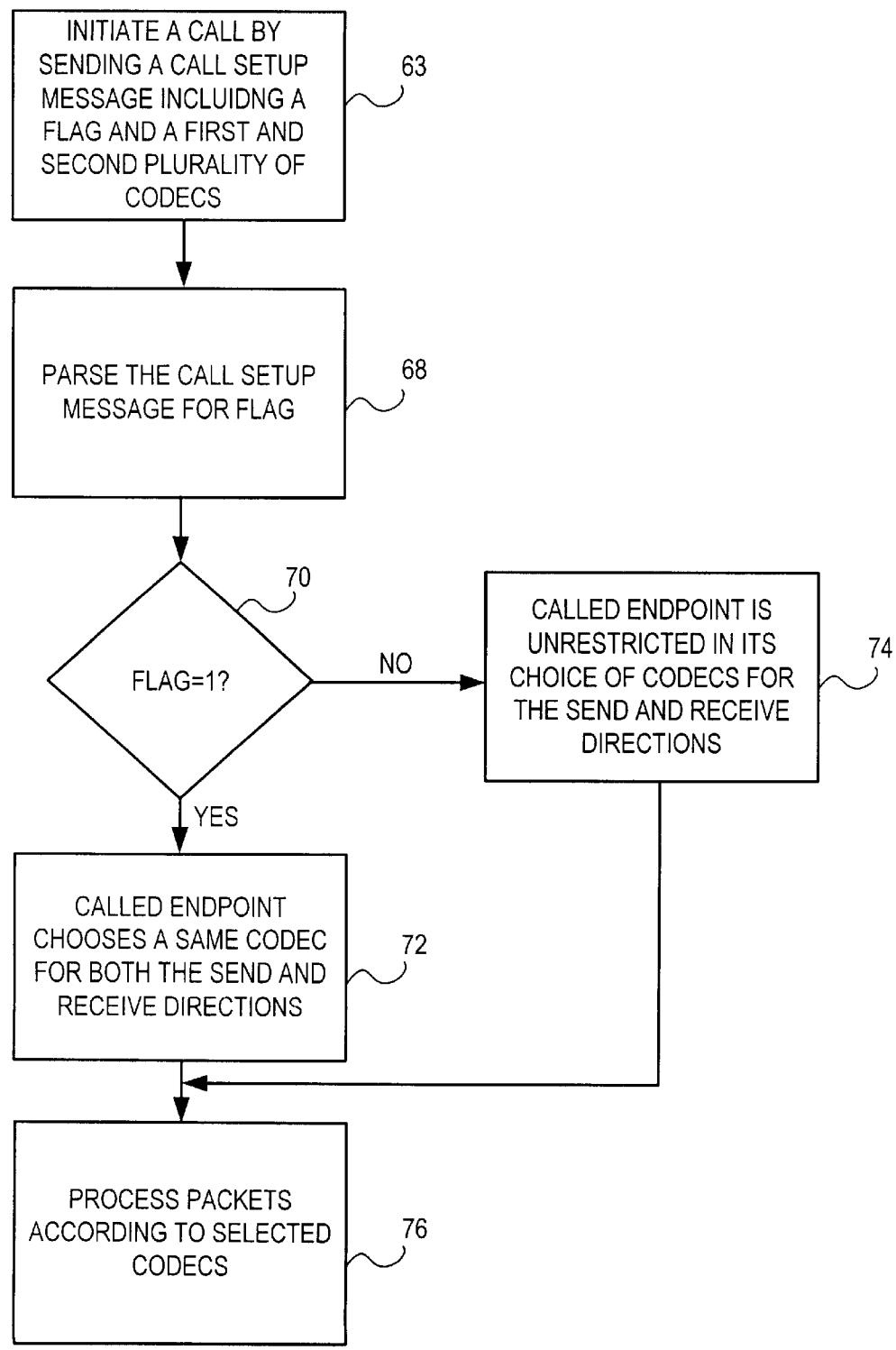
FIG. 6 is a flowchart of the present invention.

FIG. 6 is a flowchart showing how the present invention is implemented. At step 63 a call is initiated by sending a call setup message 43 from the calling endpoint 40 to the called endpoint 42. The setup message 43 sent by the calling endpoint 40 offers the called endpoint 42 a choice of a first and second plurality of channel capabilities for a send and receive directions, respectively. At step 68, the called endpoint 42 parses the call setup message 43 for a flag. The called endpoint 42 in step 70 evaluates the flag to determine whether the calling endpoint 40 supports asymmetric capabilities. If a flag is detected in step 72 indicating that the calling endpoint 40 does not support asymmetric capabilities, the called endpoint 42 chooses a same capability from the first and second plurality of capabilities for both the send and receive directions. Conversely, if the flag indicates in step 74 that the calling endpoint 40 does support asymmetric capabilities, the called endpoint 42 is unrestricted in its choice of capabilities. Packets are then processed in step 76 instituting communications between endpoints 40 and 42 according to the selected codecs.

By establishing the call in this manner, a calling endpoint 40 that does not support asymmetric capabilities is not faced with a failed call because the called endpoint 42 has selected different or asymmetric capabilities for the send and receive directions. Thus, the call is successfully set up avoiding the necessity of defaulting to less efficient and more overhead-requiring H.245 TCP call procedures.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A packet switched communications system, comprising:
   a calling endpoint for sending a call setup message through a packet switched network;
   the calling endpoint including a flag in the call setup message for indicating to a called endpoint whether it can choose asymmetric channel capabilities;

the calling endpoint receiving a message from the called endpoint identifying channel capabilities responsive to the flag; and the calling endpoint establishing a communications channel on the packet switched network according to the identified channel capabilities.

2. The packet switched communications system of claim 1 wherein the flag has a first and a second state, the first state indicating to the called endpoint that it cannot choose asymmetric channel capabilities.

3. The packet switched communications system of claim 1 wherein the call setup message includes:

a first plurality of codec options for a send direction of the communications channel; and a second plurality of codec options for a receive direction of the communications channel.

4. The packet switched communications system of claim 3 wherein the flag has a first and a second state, the first state indicating to the called endpoint that it must choose a same codec option from the first and second plurality of codec options for both the send and receive directions of the communications channel.

5. The packet switched communications system of claim 4 wherein the second state indicates to the called endpoint that is may choose either the same or a different codec from the first and second plurality of codec options for the send and receive directions of the communications channel.

6. The packet switched communications system of claim 1 wherein the communications systems is governed by ITU-T Recommendation H.323, the calling endpoint is a H.323 endpoint, the call setup message is a SETUP message, and the flag is included in an OpenLogicalChannel structure of a faststart element in the SETUP message.

7. The packet switched communications systems of claim 6 wherein the calling endpoint is a H.323 terminal, multi-point control unit, or gateway.

8. A packet switched communications system, comprising:

a called endpoint for receiving a call setup message through a packet switched network;

the called endpoint receiving a flag included in the call setup message for indicating whether the called endpoint can use asymmetric channel capabilities;

the called endpoint identifying channel capabilities responsive to the flag; and the called endpoint establishing a communications channel on the packet switched network according to the identified channel capabilities.

9. The packet switched communications system of claim 8 wherein the flag has a first and a second state, the first state indicating that the called endpoint should not choose asymmetric channel capabilities.

10. The packet switched communications system of claim 8 wherein the call setup message includes:

a first plurality of codec options for a send direction of the communications channel; and a second plurality of codec options for a receive direction of the communications channel.

11. The packet switched communications system of claim 10 wherein the flag has a first and a second state, the first state indicating to the called endpoint that it must choose a same codec from the first and second plurality of codecs for both the send and receive directions of the communications channel.

12. The packet switched communications system of claim 11 wherein the second state indicates to the called endpoint that it may chose either the same or a different codec from the first and second plurality of codecs for the send and receive directions of the communications channel.

13. The packet switched communications system of claim 8 wherein the communications systems is governed by ITU-T Recommendation H.323, the called endpoint is a H.323 endpoint, the call setup message is a SETUP message, and the flag is included in an OpenLogicalChannel structure of a faststart element in the SETUP message.

14. The packet switched communications systems of claim 13 wherein the called endpoint is a H.323 terminal, multi-point control unit, gateway.

15. A call setup message in a communications system sent from a calling endpoint to a called endpoint through a packet switched network, the call setup message comprising:

a first plurality of communications capabilities for a send direction;

a second plurality of communications capabilities for a receive direction; and a flag having a first and a second state for indicating to the called endpoint whether it can choose asymmetric communications capabilities.

16. The call setup message of claim 15 wherein the first plurality of communications capabilities is a first plurality of codec options and the second plurality of communication capabilities is a second plurality of codec options.

17. The call setup message of claim 16 wherein the flag being in the first state indicates to the called endpoint to choose a same codec from the first and second plurality of capabilities for the send and receive directions, respectively.

18. The call setup message of claim 16 wherein the communications system is governed by the ITU-T Recommendation H.323, the call setup message is a SETUP message including a faststart element, and the flag is included in the faststart element.

19. A method for improving communications efficiency in a packet based communications system, comprising:

sending a call setup message from a calling endpoint to a called endpoint;

offering the called endpoint a choice of a first plurality of capabilities for a send direction and a second plurality of capabilities for a receive direction in the call setup message;

sending a flag in the call setup message that indicates whether the called endpoint can choose asymmetric capabilities;

identifying at least one of the offered first and second plurality of capabilities for the send and receive directions, respectively, responsive to the flag; and sending and receiving data using the identified capabilities responsive to the flag.

20. The method of claim 19 wherein identifying includes choosing a same capability for the send and receive directions from the first and second plurality of capabilities, respectively, if the called endpoint cannot choose asymmetric capabilities.

21. The method of claim 19 wherein identifying includes being unrestricted in choosing a capability for the send and receive directions if the called endpoint can choose asymmetric capabilities.

22. The method of claim 19 wherein offering the called endpoint the choice includes offering the called endpoint a choice of a first plurality of codec options for the send direction and a second plurality of codec options for the receive direction.

23. The method of claim 22 wherein identifying includes choosing a same codec option for the send and receive directions from the first and second plurality of codec options, respectively, if the called endpoint cannot choose asymmetric capabilities.

24. The method of claim 22 wherein identifying includes being unrestricted in choosing a codec option for the send and receive directions if the called endpoint can choose asymmetric capabilities.

25. The method of claim 19 wherein the packet based communications system is governed by the ITU-T Recommendation H.323, the calling and called endpoints are H.323 endpoints, and the call setup message is a SETUP message.

26. The method of claim 25 including sending the flag in an OpenLogicalChannel structure of a faststart element in the SETUP message.

27. A method for improving communications efficiency in a packet based communications system, comprising:

sending a call setup message from a calling endpoint to a called endpoint;

offering the called endpoint a choice of a first plurality of capabilities for a send direction and a second plurality of capabilities for a receive direction in the call setup message;

sending a flag in the call setup message that indicates whether the called endpoint can choose asymmetric capabilities;

identifying at least one of the offered first and second plurality of capabilities for the send and receive directions, respectively, responsive to the flag; and sending and receiving data using the identified capabilities responsive to the flag; and detecting the flag using a bit map.

28. A method for setting up a communications channel in a packet switched network, comprising:

receiving a call set up message including a first set of codec options for encoding signals into packets and second set of codec options for decoding packets back into signal;

parsing the call setup message for a flag indicating whether a called endpoint can choose asymmetric or symmetric codecs for encoding and decoding data; and choosing codec options from the first and second set of codec options according to a state of the flag.

29. The method of claim 28 wherein choosing codec options includes choosing a same codec from the first and second set of codecs for both encoding and decoding data if the flag indicates that the called endpoint can choose symnmetric codecs.

30. The method of claim 28 wherein choosing codec options includes choosing a same or different codec from the first and second set of codecs for both encoding and decoding data if the flag indicates that the called endpoint can choose asymmetric codecs.

* * * * *